United States Patent [19]

Shibata et al.

[11] 4,023,292
[45] May 17, 1977

[54] BINDER LOOSE LEAF

[76] Inventors: Ryoji Shibata, No. 3-45, Higashi Takaai-cho; Zenzaburo Shibata, No. 4-1, Yuzato-cho, both of Higashi Sumiyoshi, Osaka, Japan

[22] Filed: Sept. 1, 1976

[21] Appl. No.: 719,868

[30] Foreign Application Priority Data

Sept. 27, 1975 Japan .................. 50-131465[U]

[52] U.S. Cl. .......................... 40/158 R; 40/104.18
[51] Int. Cl.² ........................................ G09F 1/10
[58] Field of Search ............... 40/158 R, 158 B, 63, 40/104.18; 156/258, 62.2; 428/40

[56] References Cited

UNITED STATES PATENTS

| | | | |
|---|---|---|---|
| 2,603,899 | 7/1952 | Leander | 40/125 A |
| 3,304,641 | 2/1967 | Gonczy | 40/158 R |
| 3,503,835 | 3/1970 | Hermann | 40/158 R |
| 3,893,252 | 7/1975 | Chase | 40/158 R |

*Primary Examiner*—Louis G. Mancene
*Assistant Examiner*—Wenceslao J. Contreras
*Attorney, Agent, or Firm*—Frank J. Jordan

[57] ABSTRACT

A binder loose leaf for mounting photographs or the like. It is made up of a flat base having a pressure-sensitive non-drying adhesive composition coated over one of its face and an air-protection film applied over the adhesive composition. This film can easily be removed by light rubbing friction to expose the adhesive composition when it is desired to fix a photograph or the like on the loose leaf.

5 Claims, 8 Drawing Figures

BINDER LOOSE LEAF

BACKGROUND OF THE INVENTION

1. Field of the Invention

The present invention generally relates to a leaf construction for mounting display articles such as photographs, name cards, newspaper clippings in albums, scrapbooks and the like.

2. Prior Art

It is known to use corner retainers having a glued back and a pouched triangular insert for holding the corners of photographs and similar flat display articles firmly onto the loose leaves or pages of albums and scrapbooks. Display articles mounted in this manner tend, however, easily to move from their original positions and, in some cases, even to drop off the leaves. Furthermore, it is troublesome to dispose such retainers at the proper locations and also to apply them to the loose leaves.

Photographs or the like may of course be glued directly to the leaves but this is likewise inconvenient and often, with time, the glued articles curl and come loose. Furthermore, the chemical composition of which the glue is made sometimes stain the display articles.

An appreciable improvement in mounting leaves for displaying articles has been made by the use of a cardboard base having a pressure-sensitive adhesive composition printed on at least one of its faces, as disclosed in my prior U.S. Pat. Nos. 3,670,434 of June 13, 1972 and 3,736,685 of June 5, 1973. The cardboard base in the loose leaves of these U.S. Patents, over which the adhesive composition is applied, is covered with a transparent sheet of plastics material; the photographs and other similar articles to be displayed being mounted between the base and this transparent sheet cover so that they can clearly be viewed. Such cardboard base has a tendency to absorb or expel moisture depending upon the humidity of the ambient atmosphere and tends also to expand or shrink due to such absorption of expulsion of moisture. In contrast, the cover sheet of transparent plastics material is little affected by a change in the humidity of the normal ambient atmosphere. As this cover sheet does not stick very much to the base through the pressure-sensitive adhesive composition, shrinkage or expansion of the base causes the cover sheet to wrinkle which seriously damages the commercial value of the mounting leaf. Also, further moisture expelled from the base tends to be trapped underneath the cover sheet especially at the center of the leaf where the moisture can hardly escape. The trapped moisture affects the nature of the pressure-sensitive composition printed on the cardboard base. As a result, the adhesive composition tends to move from the base to the cover sheet, or the cover sheet, or the cover sheet firmly sticks to the adhesive-covered base and cannot be peeled off without damaging it. The damage to the properties of the adhesive composition is fatal to the commercial value of the mounting leaves. Since humidity varies widely from season to season as well as at different geographical or storage locations, the above-mentioned drawbacks present serious problems to the storing, transporting or displaying of the mounting leaves.

The problem of the shrinkage or expansion of the base has been solved by making it out of a foaming synthetic resin or a foamed rubber which, by nature, are not affected by moisture. However, the problem of the deterioration of the properties composition has not been solved. This is because the adhesive composition is normally applied over the base in the form of a pattern consisting of spaced parallel lines defining therebetween channels which allow atmospheric air to enter and affect the nature of the adhesive composition.

This drawback is particularly notable where the displayed articles, such as photographs, are mounted side by side in closely spaced relationship. Such an arrangement easily results in air being trapped between the transparent cover sheet and the adhesive composition applied over the base. The only remedy to avoid this inconvenience is to arrange the displayed articles spaced apart sufficiently to allow the transparent cover sheet to reach the space between photographs and thereby adhere to the adhesive composition.

The use of the aforesaid known mounting leaves also has the inconvenience that a certain skill is required for closing and pressing the transparent cover film or sheet against the base without the formation of air bubbles between the two. Such air bubbles mar the appearance of the entire display and furthermore make it difficult to view the attached articles properly.

SUMMARY OF THE INVENTION

With the above-mentioned shortcomings of the prior art in view, it is a primary object of the present invention to provide a novel mounting leaf for holding display articles such as photographs, name cards, newspaper clippings and the like in place securely and quickly with great ease in an album or scrapbook, particularly of the loose-leaf type.

Another object of the invention is to provide a mounting leaf having a pre-coated adhesive composition which is kept intact and unimpaired over an extended length of time.

A further object of the invention is to provide a mounting leaf of the aforesaid type which is simple in construction and which is easy to manufacture.

According to the instant invention, there is provided a mounting leaf comprising: a generally flat base; a pressure-sensitive non-drying adhesive composition coated over said flat base and over which photographs or the like are applied to be visually held, and a light-friction-removable and ambient-air protection film applied over the adhesive composition, whereby a photograph or the like is applied over the adhesive composition by light-friction removal of a portion of the film which is commensurate with the size of the picture or the like.

DESCRIPTION OF THE PREFERRED EMBODIMENT

Figure 1:
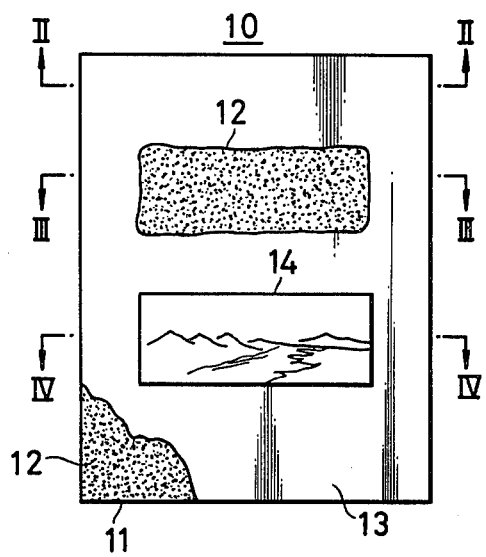
FIG. 1 is a plan view of a mounting leaf made according to the present invention.
Figure 2:
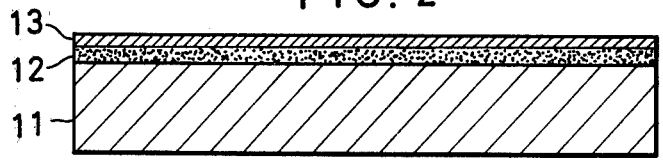
FIGS. 2, 3 and 4 are enlarged cross-sectional views taken in planes containing lines II—II, III—III and IV—IV of FIG. 1.
Figure 3:
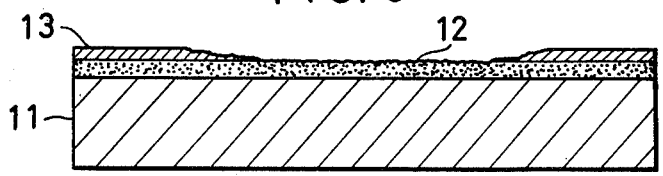
Figure 4:
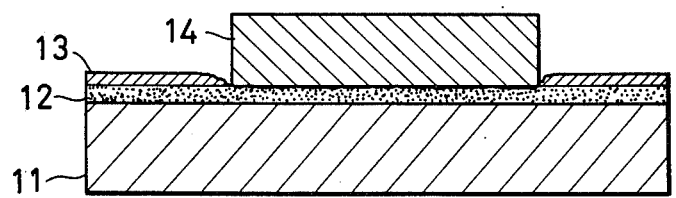

Referring now to FIGS. 1 and 2, there is shown a mounting leaf 10 made up of a relatively thick base 11 which may be cardboard, paper, cloth, plastics material or other suitable sheet materials. This base is provided, at least over one surface thereof, with a coat 12 of a pressure-sensitive non-drying adhesive composition known in the art and such as disclosed in my prior U.S. Pat. No. 3,736,685 of June 5, 1973. This coat 12 of adhesive composition may be spread over the entire surface of the base 11 or discretely applied to define various patterns such as those shown in the aforesaid U.S. patent. For example, the adhesive coat 12 may be spread in the from of spaced apart lines extending laterally or longitudinally over the base 11 so as to form a strip arrangement defining channels therebetween. The adhesive coat may also be applied as dots, slanted lines or the like as is shown in present FIG. 7.

A layer of friction-removable and ambient-air protection material 13 is deposited over the adhesive coat 12 in order, as said, to avoid the latter from being directly exposed to ambient atmosphere. For this reason, this removable layer or film is deposited over the entire surface of the base 11 so as to ensure complete sealing of the coat 12 of adhesive composition to protect it from the surrounding atmosphere which would affect its nature. The nature of this film 13 is such that it can easily be peeled off the coat 12 of adhesive composition by rubbing it with a relatively hard object or with a finger or fingernail. There may be considered a variety of materials for such light friction-removable and air-protection film. Preferred compositions of the film 13 are exemplified as follows:

| | |
|---|---|
| I) vinyl acetate emulsion ("NIKASOL" tradenamed and manufactured by Japan Carbide Industries Ltd.) | 50 parts by weight |
| titanium or talc | 15 parts by weight |
| anti-foaming agent | 0.5 parts by weight |
| anti-ageing agent | 1.5 parts by weight |
| casein solution containing 15% solids | 20 parts by weight |
| water | 13 parts by weight |
| II) styrene-butadiene rubber latex | 50 parts by weight |
| titanium or talc | 15 parts by weight |
| anti-foaming agent | 0.5 parts by weight |
| anti-ageing agent | 1.5 parts by weight |
| casein solution containing 15% solids | 20 parts by weight |
| water | 13 parts by weight |
| III) acrylic resin emulsion | 55 parts by weight |
| titanium or talc | 15 parts by weight |
| anti-foaming agent | 1.5 parts by weight |
| anti-ageing agent | 0.5 parts by weight |
| casein solution containing 15% solids | 20 parts by weight |
| water | 8 parts by weight |

The use of titanium or talc is intended to render white or otherwise conceal the surface color of the base 11. The anti-foaming agent is required to suppress the formation of pin holes in the protection film 13.

Figure 5:
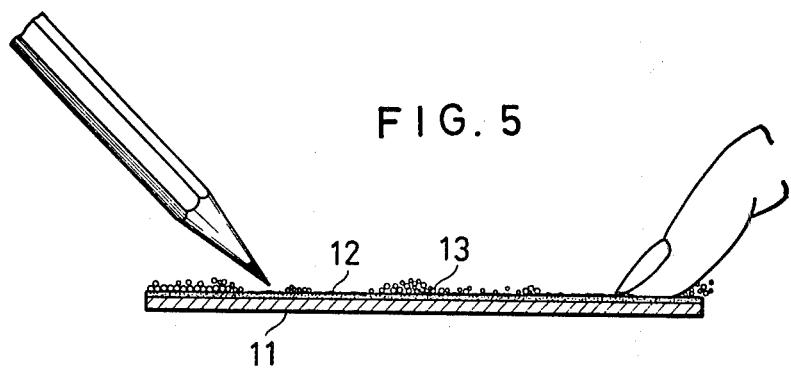
FIGS. 5 and 6 are cross-sectional views of the mounting leaf intended particularly to illustrate different types of friction-removable air-protection films and also showing how the film is removed.

In mounting a display article 14 on the surface of the mounting leaf 10 and at any desired location thereon, the friction-removable air-protection film 13 at the desired location is first rubbed off by means of a relatively hard object such as a pencil or even a fingernail, as shown in FIG. 5, until the adhesive composition 12 on the surface of the base 11 is exposed. The display article 14 is then placed over the exposed adhesive surface and is thus held on the base 11 through the aforesaid pressure-sensitive non-drying adhesive 12.

Figure 6:
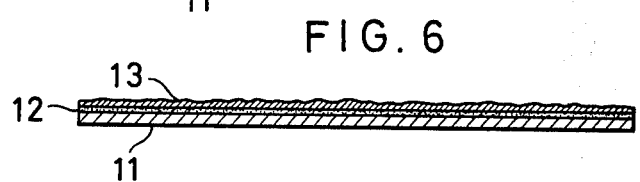

In order to facilitate removal of the protection film 13 by a finger or a pencil, the film may be applied over the adhesive composition to produce a rugged surface pattern such as the even-grained pattern of FIG. 5 or the wavy or squamous pattern of FIG. 6.

Figure 7:
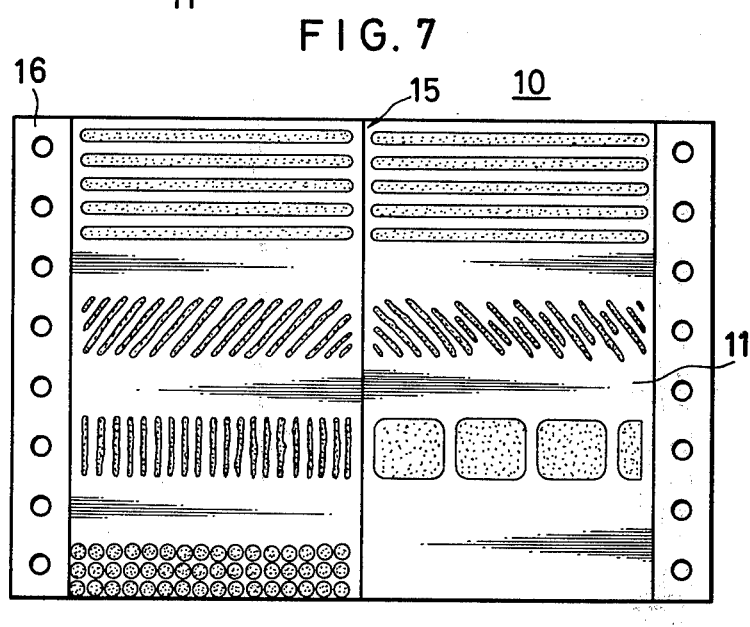
FIGS. 7 and 8 are, respectively, a plan view and a partial cross-sectional view of a mounting leaf made according to the teaching of the present invention.
Figure 8:
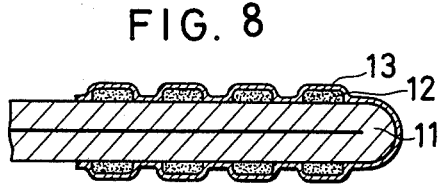

FIGS. 7 and 8 illustrate another embodiment of the invention wherein a relatively thick base 11 made of paper or cardboard is coated with the adhesive composition 12 and the removable protection film 13, successively, and the sheet then folded along center line 15 so that the two faces of the base which are coated with the coat 12 and the film 12 lie on the outside, as shown in FIG. 8. Loose-leaf binder holes 16 are provided along the common outer edges of the folded leaf so that the latter may be inserted in a loose-leaf binder acting as an album or scrapbook.

As the adhesive composition is totally covered by the removable protection film, it is protected from direct contact with ambient atmospheric air thereby preventing its ageing.

The structure of the mounting leaf above-described is, as will be gathered, simple and therefore easily and inexpensively manufactured. Furthermore, the operation of mounting the display articles by the user is rendered extremely easy.

Having thus described embodiments of the invention, it is to be understood that various changes and modifications may be made in the specific form and construction described without departing from the invention of which the scope is defined in the appended claims.

What is claimed is:

1. A photograph or the like mounting leaf for albums or scrapbooks, comprising:

a generally flat base; a pressure-sensitive non-drying adhesive composition coated over said flat base and over which photographs or the like are applied to be visually held, and a light-friction-removable and ambient-air protection film applied over said adhesive composition whereby a photograph or the like is applied over said adhesive composition by light-friction removal of a portion of said film commensurate with the size of said photographs or the like.

2. A mounting leaf as claimed in claim 1, wherein said air-protection film generally comprises 50 parts by weight of vinyl acetate emulsion ("NIKASOL" tradenamed and manufactured by Japan Carbide Industries Ltd.), 15 parts by weight of titanium or talc, 0.5 parts by weight of anti-foaming agent, 1.5 parts by weight of anti-ageing agent, 20 parts by weight of casein solution containing 15% solids, and 13 parts by weight of water.

3. A mounting leaf as claimed in claim 1, wherein said air-protection film generally comprises 50 parts by weight of styrene-butadiene rubber latex, 15 parts by weight of titanium or talc, 0.5 parts by weight of anti-foaming agent, 1.5 parts by weight of anti-ageing agent, 20 parts by weight of casein solution containing 15% solids, and 13 parts by weight of water.

4. A mounting leaf as claimed in claim 1, wherein said air-protection film generaly comprises 55 parts by weight of acrylic resin emulsion, 15 parts by weight of titanium or talc, 1.5 parts by weight of anti-foaming agent, 0.5 parts by weight of anti-ageing agent, 20 parts by weight of casein solution containing 15% solids, and 8 parts by weight of water.

5. A mounting leaf as claimed in claim 1, wherein said protection film has a rugged outer surface for easy friction removal.

* * * * *